United States Patent
Penttinen

(10) Patent No.: US 6,275,481 B1
(45) Date of Patent: Aug. 14, 2001

(54) PROCEDURE FOR SETTING UP AN EMERGENCY CALL IN A WIRELESS LOCAL LOOP

(75) Inventor: Simo Penttinen, Oulu (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/414,225

(22) Filed: Oct. 7, 1999

Related U.S. Application Data

(63) Continuation of application No. PCT/FI98/00310, filed on Apr. 8, 1998.

(30) Foreign Application Priority Data

Apr. 18, 1999 (FI) .................................................. 971682

(51) Int. Cl.[7] .................................................. H04Q 7/00
(52) U.S. Cl. ........................... 370/329; 370/229; 379/37
(58) Field of Search .................................. 370/329, 328, 370/336, 337, 431, 437, 442, 443, 229, 230, 231; 379/37, 45; 455/404, 509, 464, 450

(56) References Cited

U.S. PATENT DOCUMENTS

| 5,596,625 | * | 1/1997 | LeBlanc | 455/404 |
| 5,678,188 | * | 10/1997 | Hisamura | 455/509 |
| 5,822,420 | * | 10/1998 | Bolon et al. | 379/230 |
| 5,937,355 | * | 8/1999 | Joong et al. | 455/466 |
| 6,067,457 | * | 5/2000 | Ericson et al. | 455/512 |
| 6,069,948 | * | 5/2000 | Yrjana | 379/230 |

FOREIGN PATENT DOCUMENTS

| 0 304 955 | 3/1989 | (EP) . |
| WO 96/31015 | 10/1996 | (WO) . |
| WO 97/48224 | 12/1997 | (WO) . |
| WO 97/49231 | 12/1997 | (WO) . |

OTHER PUBLICATIONS

International Search Report for PCT/FI98/00310.

* cited by examiner

*Primary Examiner*—Alpus H. Hsu
*Assistant Examiner*—Brian Nguyen
(74) *Attorney, Agent, or Firm*—Altera Law Group, LLC

(57) ABSTRACT

Subscriber terminal units (TU) are connected over a wireless link via a base station (BS) to an access node (AN) and further from the access node to a local exchange (LE) via a standard V5.2 interface, in which, when the interface is congested and a subscriber (TU) connected to the access node (AN) is attempting to make an emergency call to a public emergency number, the call control system of the local exchange (LE) cannot at once find a free time slot for the setup of the emergency call. In the procedure, call setup requests for other than emergency calls over the V5.2 interface are disabled during a predetermined period of time t2, and attempts to allocate a time slot in the V5.2 interface for the emergency call are repeated during such predetermined period of time t2.

19 Claims, 5 Drawing Sheets

PROCEDURE FOR SETTING UP AN EMERGENCY CALL IN A WIRELESS LOCAL LOOP

This is a continuation of PCT/FI98/00310 filed Apr. 1998.

BACKGROUND OF THE INVENTION

1. Field of the Invention

The present invention relates to a procedure for setting up an emergency call in a wireless local loop.

2. Description of the Related Art

The invention concerns a wireless local loop system, in which a subscriber is connected over a wireless link via an access node (AN) to a wired network local exchange. The subscriber terminal devices are connected to the access node via a GSM/DCS 1800 interface (GSM, Global System for Mobile Communications; DCS, Digital Cellular System). The access node is connected to the local exchange via a V5.2 interface consistent with the ETS 300 347 standard series. GSM is a European digital mobile communication system standardized by ETSI. DCS-1800 is a mobile communication system standardized by ETSI, which is based on the GSM specification and aims at a more effective use of microcells and which works in the frequency range of 1800 MHz. Between the terminal device and the access node there is a base station, through which call signals sent by the terminal device over a radio channel are transmitted via the access node to a public telephone network and vice versa. The access node can be connected to the telephone exchange using e.g. the V5.1 or V5.2 protocol.

Open interfaces (V5.1 and V5.2) between an access node and a telephone exchange are defined in the ETSI (European Telecommunications and Standards Institute) standards of the ETS 300 324 and ETS 300 347 series. V5 interfaces enable subscribers belonging to a physically separate access network, which may be either a wired or a wireless network, to be connected to a telephone exchange using a standard interface. A dynamic V5.2 concentrator interface consistent with the standards ETS 300 347-1 and 347-2 consists of one or more (1–16) PCM (Pulse Code Modulation) cables. One PCM cable comprises 32 channels, each of which with a transfer rate of 64 kbit/s, i.e. 2048 kbit/s in all. The V5.2 interface supports analogue telephones as used in the public telephone network, digital, such as ISDN (Integrated Services Digital Network) basic and system subscriptions as well as other analogue or digital terminal equipment based on semi-fixed connections.

A call initiated with an EMERGENCY_SETUP message as described in the GSM system specification may, if the resources prove to be insufficient, star a process of forced release of a call having a lower priority.

When a subscriber connected to the access node of a wireless local loop tries to make an emergency call to a public emergency number and if the call control system of the local exchange is unable to find a free time slot in the V5.2 interface within a predetermined period of time, then the call setup will fail. The subscriber will keep trying again until the call is successfully set up. The standard V5.2 interface contains no definition of forced call setdown or an emergency call as such. When the setup of an emergency call fails due to congestion, the WLL terminal will generate a busy tone for the subscriber. Consequently, the subscriber will try to call again. In practice, the entire signalling required for call setup is generated anew, starting from the allocation of a communication channel, resulting in unnecessary burdening of the wireless network resources.

BRIEF SUMMARY OF THE INVENTION

The object of the present invention is to eliminate the drawbacks described above.

The object of the invention is to disclose a procedure that makes it possible to increase the probability of successful setup of an emergency call and allows an emergency call to be set up over a congested V5.2 interface without repeated allocation of radio resources and without repeated call control signalling within the access node.

In accordance with the invention, there is provided 1. Procedure for setting up an emergency call in a wireless local loop, in which subscriber terminal units (TU) are connected over a wireless link via a base station (BS) to an access node (AN) and further from the access node to a local exchange (LE) via a standard V5.2 interface, in which, when the interface is congested and a subscriber (TU) connected to the access node (AN) is attempting to make an emergency call to a public emergency number, a call control system of the local exchange (LE) is unable to find a free time slot for the setup of the emergency call within a predetermined period of time t1, wherein call setup requests for other than emergency calls over the V5.2 interface are disabled during a predetermined period of time t2, and attempts to reserve a time slot in the V5.2 interface for the emergency call are repeated during the predetermined period of time t2.

In the procedure of the invention, an emergency call is set up in a wireless local loop in a congested situation. In the wireless local loop, WLL terminals are connected over a wireless link via a base station to the access node and further from the access node to a local exchange via a standard V5.2 interface. In a situation where the V5.2 interface is congested, a subscriber connected to the access node tries to make an emergency call to a public emergency number and the call control system of the local exchange is unable to find a free time slot, i.e. a channel for the setup of the emergency call in the V5.2 interface within a predetermined period of time t1.

According to the invention, new call setup requests for other than emergency calls over the V5.2 interface are disabled during a predetermined period of time t2 and attempts to allocate a time slot in the V5.2 interface for the emergency call are repeated during said predetermined period of time or until a channel is successfully allocated. However, it is also possible to implement the procedure of the invention by disabling only new outgoing non-emergency calls from the access node. In this case, new non-emergency calls addressed to subscribers connected to the access node could be enabled. A corresponding arrangement is feasible in all the embodiments described in the present application.

In an embodiment of the procedure, when a free time slot has been allocated in the V5.2 interface for the emergency call within a predetermined period of time t2 as mentioned above, call setup over the V5.2 interface is enabled.

In an embodiment of the procedure, when the subscriber who initiated the emergency call hangs up (subscriber on-hook) before a free time slot is found in the V5.2 interface, the disabled state of setup of new calls is cancelled and call setup is enabled.

In an embodiment of the procedure, when the attempts to allocate a time slot in the V5.2 interface fail during a predetermined period of time t2 as mentioned above, the emergency call is released, the disabled state of setup of new calls is cancelled and call setup is enabled.

In an embodiment of the procedure, a message indicating failure of an attempt to set up an emergency call is given by the V5.2 interface signalling program to the process responsible for the setup of the emergency call, and, via the process responsible for the setup of the emergency call, the higher-level process responsible for signalling is notified about the failed attempt to set up an emergency call. In a preferred embodiment, no such notification is given, but the V5 interface signalling program keeps sending standard establish messages until the attempt is cancelled e.g. when the subscriber hangs up (AN subscriber on-hook). In this case, the hanging up or the tripping of a timer t1 corresponds to a failure of call setup. A corresponding arrangement is also possible in other embodiments described in this application.

In an embodiment of the procedure, new call setup requests are disabled by a higher-level process and attempts to allocate a time slot in the V5.2 interface are continued by the lower-level process responsible for the emergency call.

In an embodiment of the procedure, the predetermined period of time t1 is defined using a first timer controlling normal call setup time, which is started at the beginning of call setup, and the predetermined period of time t2 is defined using a second timer controlling the disabled state of call setup, which is started and/or stopped by the higher-level process responsible for signalling.

In an embodiment of the procedure, when a free time slot for the emergency call has been found in the V5.2 interface within a predetermined period of time t2 as mentioned above, a message indicating allocation of a time slot is given by the process responsible for the emergency call to the higher-level process responsible for signalling, the second timer is stopped by the higher-level process, and setup of new calls is enabled by the higher-level process.

In an embodiment of the procedure, when the subscriber who initiated an emergency call hangs up before a time slot in the V5.2 interface is released, the higher-level process responsible for signalling is given an on-hook message, the second timer is stopped by the higher-level process, and setup of new calls is enabled by the higher-level process.

In an embodiment of the procedure, in a situation where the lower-level process responsible for the emergency call does not receive a message indicating allocation of a time slot in the V5.2 interface from the local exchange within the predetermined period of time t2, the lower-level process is instructed by the higher-level process responsible for signalling to disconnect the emergency call.

In an embodiment of the procedure, one of the ongoing non-emergency calls is selected, the selected non-emergency call is disconnected via a forced process to release a time slot in the V5.2 interface, the emergency call is set up using the released time slot, and the disabled state of setup of new calls is cancelled and call setup is enabled.

In an embodiment of the procedure, if the attempts to reserve a time slot in the V5.2 interface fail during the first and second periods of time t1+t2 combined, then the emergency call is released and the disabled state of setup of new calls is cancelled and call setup is enabled.

In an embodiment of the procedure, after the lapse of the predetermined period of time t2, forced call setdown is started again only once for the same call, and the failed emergency call to the wireless network is disconnected after forced disconnection of a call has failed again.

In an embodiment of the procedure, after the lapse of the second predetermined period of time t2, the emergency call is released and the disabled state of setup of new calls is cancelled and call setup is enabled.

In an embodiment of the procedure, the above-mentioned non-emergency call is selected by the higher-level process responsible for signalling, an instruction to disconnect the call is given by the higher-level process responsible for signalling to the lower-level process responsible for the selected non-emergency call, forced disconnection of the selected non-emergency call is effected by the lower-level process, and the second timer controlling the disabled state of call setup is started by the higher-level process responsible for signalling.

In an embodiment of the procedure, the higher-level process responsible for signalling is informed of the disconnection of the call by the lower-level process responsible for the selected disconnected call, the timer controlling the disabled state of call setup is stopped and a second timer for a time-out for the disabled state of call setup is started.

In an embodiment of the procedure, in a situation where the lower-level process responsible for the emergency call does not receive a message indicating allocation of a time slot in the V5.2 interface within the combined predetermined period of time t1+t2, the lower-level process responsible for the emergency call is instructed by the higher-level process responsible for signalling to disconnect the emergency call upon receipt of the next response to a failed request for a time slot in the V5.2 interface if the allocation of a time slot has failed again.

In an embodiment of the procedure, after the predetermined period of time t2 when timer T2 has tripped, forced call disconnection is started again only once for the same call by the higher-level process responsible for signalling, and the failed emergency call to the wireless network is disconnected after forced call disconnection has failed again.

In an embodiment of the procedure, after the predetermined second period of time t2 when the second timer trips, setup of new calls is enabled by the higher-level process responsible for signalling, and the lower-level process responsible for the emergency call is instructed by the higher-level process responsible for signalling to disconnect the emergency call.

BRIEF DESCRIPTION OF THE SEVERAL VIEWS OF THE DRAWING

In the following, the invention will be described in detail by the aid of a few examples of its embodiments by referring to the attached drawing, in which

FIG. 1 is a diagrammatic representation of a wireless local loop in which a number of subscriber terminal units TU are connected over a radio link via a base station BA to an access node AN and from the access node to a local exchange LE over a V5.2 interface consistent with the ETS 300 347-2 standard, which comprises 1–16 PCM lines (2 Mbit/s).

DETAILED DESCRIPTION OF THE INVENTION

EXAMPLE 1

Figure 1:
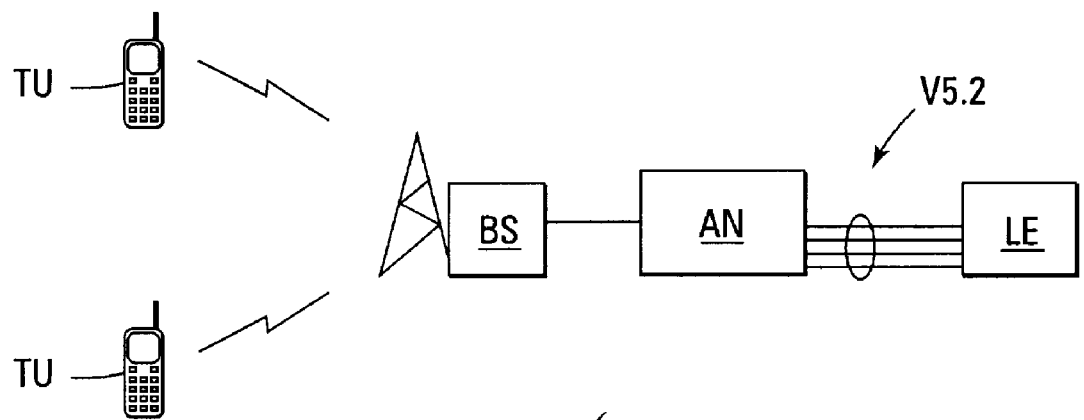
FIG. 1 presents a diagram representing a wireless local loop in which an emergency call is being set up using the procedure of the invention.
Figure 2A:
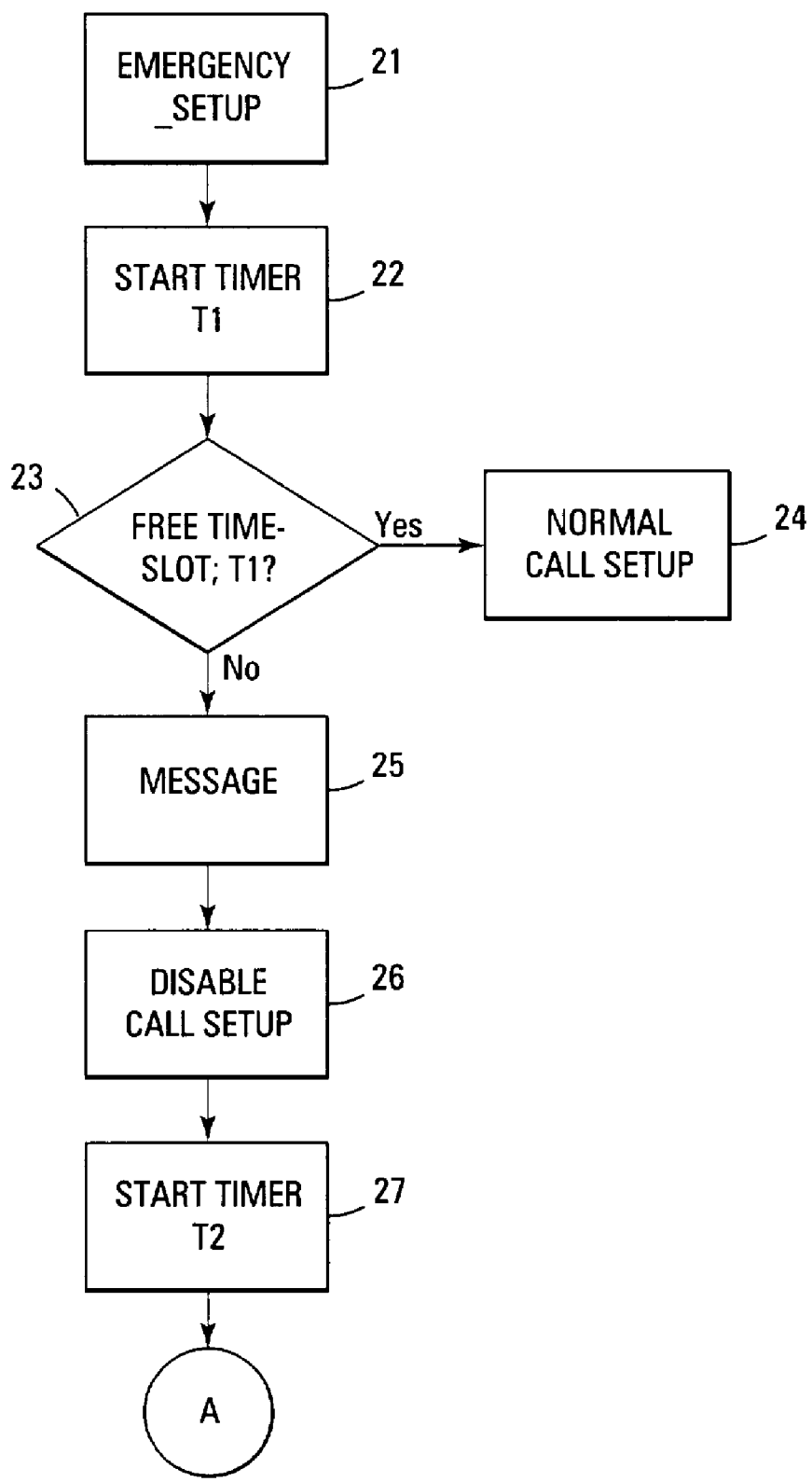
FIGS. 2a and 2b present a diagram representing a first embodiment example of the procedure of the invention.
Figure 2B:
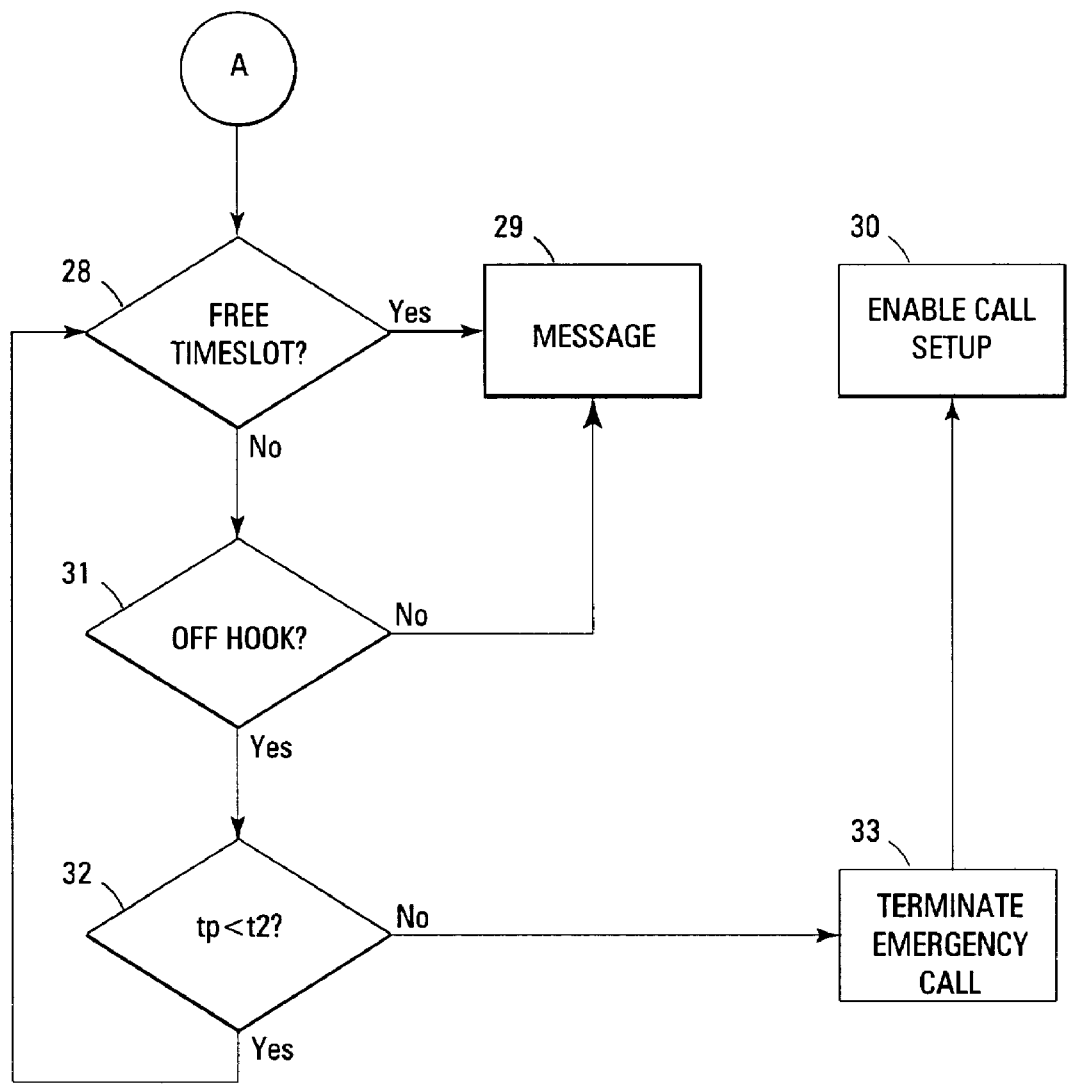
Figure 3A:
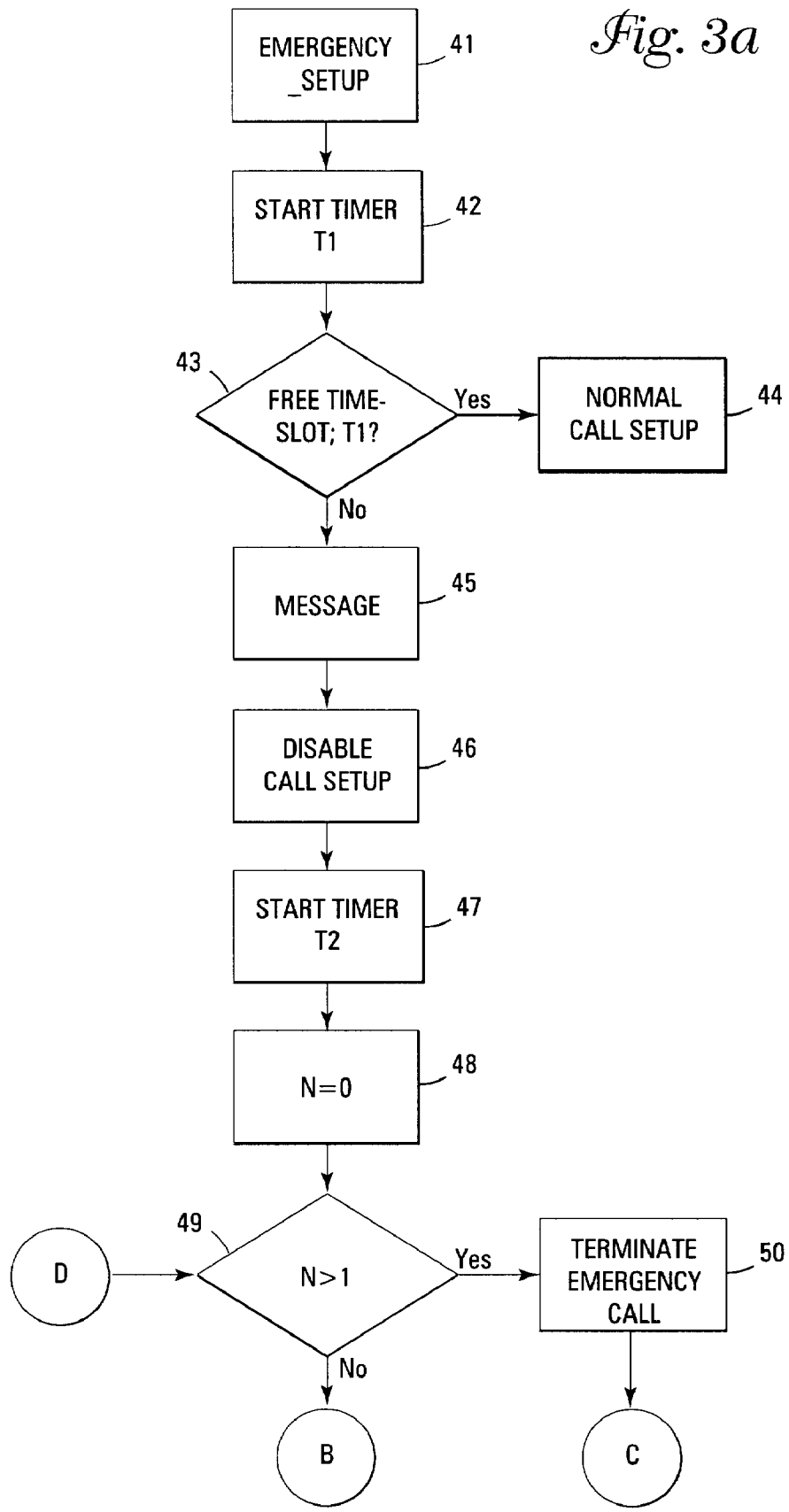
FIGS. 3a and 3b present a flow chart representing a second embodiment example of the procedure of the invention.
Figure 3B:
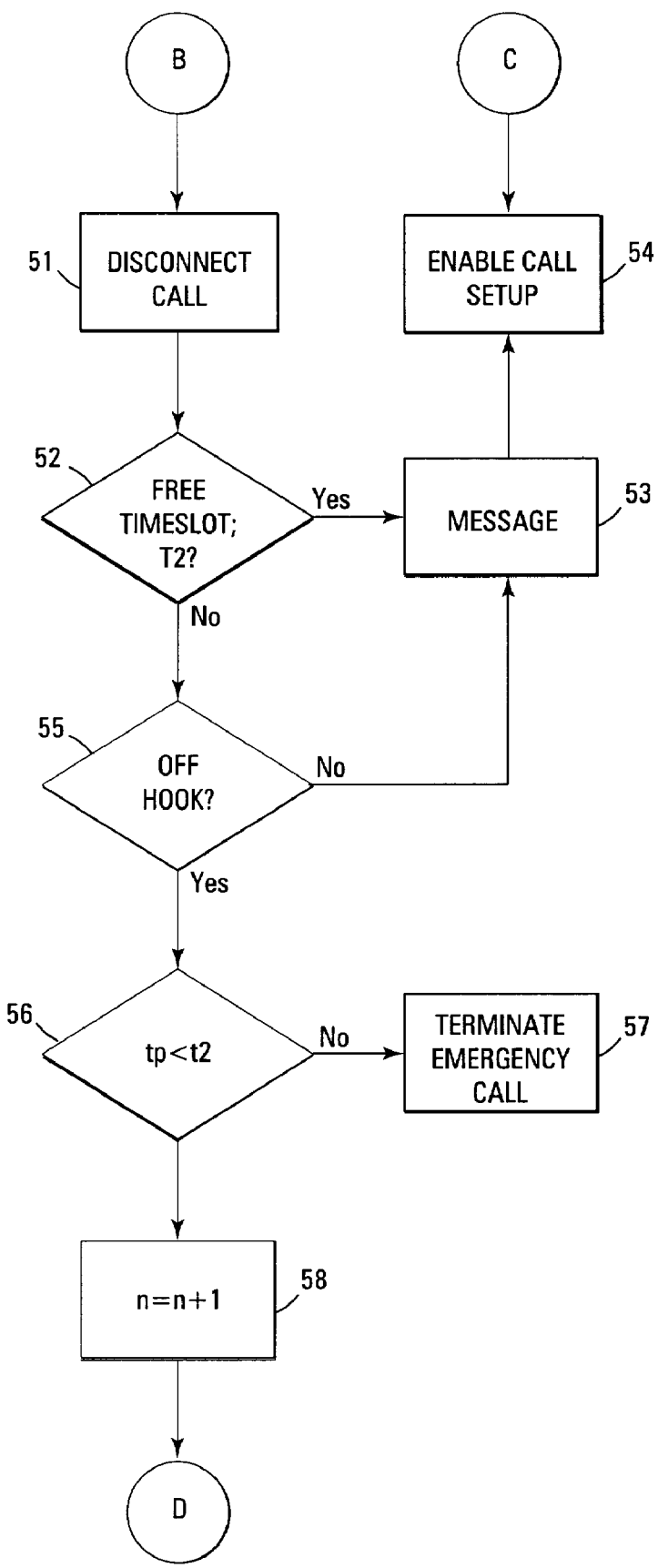

In the examples presented in FIGS. 2a and 2b, the solution used for the setup of an emergency call in a congested ituation is to queue up the call in the access node AN until a time slot is released in the V5.2 interface.

Phase 21: A subscriber starts an emergency call, in which an emergency call setup message EMERGENCY_SETUP is used.

Phase 22: A timer T1 is started to control the duration of call setup and to make sure that no extra time is spent for the call setup.

Phase 23: If the call is successful, i.e. if a free time slot is found in the V5.2 interface before the timer T1 trips, the normal call setup procedure will be initiated, phase 24. If no free time slot is found in the congested V5.2 interface, the process will go on to phase 25.

Phase 25: The V5 interface signalling program gives the process responsible for the setup of the emergency call a message indicating failure of the first setup attempt concerning the emergency call and notifies the higher-level process responsible for signalling about the event. As stated above, this notification may be omitted, in which case the expiration of time t1 corresponds to such notification.

Phase 26: The higher-level process responsible for signalling disables new call setup requests. The lower-level process responsible for the emergency call goes on attempting to allocate a time slot in the V5 interface.

Phase 27: The higher-level process starts the timer T2 controlling the disabled state of call setup.

Phase 28: If the process responsible for the emergency call is able to set up the emergency call over the V5.2 interface, phase 29, it will give a corresponding message to the higher-level process responsible for signalling.

Phase 30: Via the higher-level process, the disabled state of setup of new calls is cancelled and call setup is enabled, and timer T2 is stopped.

On the other hand, if at phase 28 the process responsible for the emergency call is unable to set up the call over the V5.2 interface, a test is carried out to establish whether the subscriber has hung up or is still off hook, phase 31. If the subscriber has hung up, a message as at phase 29 is given and setup of new calls is enabled as at phase 30.

EXAMPLE 2

In this example, the solution used for the setup of an emergency call in a congested situation is forced disconnection of a call, effected by the access node AN.

Phase 41: A subscriber starts an emergency call, in which an emergency call setup message EMERGENCY_SETUP is used.

Phase 42: A timer T1 is started to control the duration of call setup and to make sure that no extra time is spent for the call setup.

Phase 43: If the call is successful, i.e. if a free time slot is found in the V5.2 interface before the lapse of time t1, the normal call setup procedure will be initiated, phase 44. If no free time slot is found in the congested V5.2 interface, the process will go on to phase 45.

Phase 45: The V5 interface signalling program gives the process responsible for the setup of the emergency call a message indicating failure of the first setup attempt concerning the emergency call and notifies the higher-level process responsible for signalling about the event.

Phase 46: The higher-level process responsible for signalling disables new call setup requests. The lower-level process responsible for the emergency call goes on attempting to allocate a time slot in the V5 interface.

Phase 47: The higher-level process starts a timer T2 controlling the disabled state of call setup.

Phase 48: A counter n=0 is reset. The counter value n is used to ensure that forced disconnection is performed only once on the call selected to release a time slot.

Phase 49: The counter value n is checked to see if it is higher than one. As the counter value n was initially set to zero, the process will first proceed through this phase directly to phase 51. If the counter value n is 2 or higher, i.e. n>1, setup of the emergency call is terminated, phase 50, and setup of new calls is enabled, phase 54.

Phase 51: The higher-level process responsible for signalling selects one of the non-emergency calls (other than emergency calls) and instructs the lower-level process responsible for this call to disconnect it.

Phase 52: If the process responsible for the emergency call is now able to set up the call over the V5.2 interface, i.e. makes use of the free time slot within time t2, execution will proceed to phase 53, at which the process responsible for the emergency call informs the higher-level process responsible for signalling about the event. At phase 54, the higher-level process enables setup of new calls and stops the timer T2.

Phase 55: If no free time slot is found, i.e. the emergency call is unsuccessful, a test is carried out to establish whether the subscriber has hung up or is still off hook.

If the subscriber who started the call has hung up before a time slot is released in the V5.2 interface, the process responsible for the emergency call will notify the higher-level process about the event, phase 53. The higher-level process will then enable setup of new calls and stop the timer T2, phase 54.

If the test at phase 55 indicates that the subscriber is off hook and the lower-level process responsible for the call selected for disconnection has disconnected the call, it will give a corresponding message to the higher-level process responsible for signalling.

Phase 56: A test is carried out to establish whether the lower-level process responsible for the emergency call has received from the local exchange a message indicating allocation of a V5.2 interface time slot within the time t2 measured by timer T2, in other words, whether tp is smaller than t2.

If the lower-level process responsible for the emergency call does not receive a message indicating allocation of a time slot in the V5.2 interface from the local exchange within the period of time t2, in other words, if tp>t2, the higher-level process responsible for signalling will instruct the lower level process responsible for the emergency call to disconnect the emergency call, phase 57, upon receiving the next response to a request for allocation of a time slot in the V5.2 interface if allocation has failed again. After that, setup of new calls will be enabled, phase 54.

If there is any time left, in other words, if the period of time t2 has not yet elapsed (tp<t2), then the counter value n will be increased by 1, phase 58, and action will be resumed at phase 49, from where the process will go on again as described above.

The invention is not restricted to the examples of its embodiments described above, but many variations are possible within the scope of the inventive idea defined by the claims.

What is claimed is:

1. A method for setting up an emergency call in a wireless local loop, in which subscriber terminal units (TU) are connected over a wireless link via a base station (BS) to an access node (AN) and further from the access node to a local exchange (LE) via a standard V5.2 interface, in which, when the interface is congested and a subscriber (TU) connected to the access node (AN) is attempting to make an emergency call to a public emergency number, a call control system of the local exchange (LE) is unable to find a free time slot for the setup of the emergency call within a predetermined period of time t1, wherein:

a message indicating failure of an attempt to set up an emergency call is given by a V5.2 interface signalling program to a process responsible for the setup of the emergency call;

via the process responsible for the setup of the emergency call, a message indicating failure of an attempt to set up the emergency call is given to a higher-level process responsible for signalling;

call setup requests for other than emergency calls over the V5.2 interface are disabled during a predetermined period of time t2; and attempts to reserve a time slot in the V5.2 interface for the emergency call are repeated during said predetermined period of time t2.

2. The method as defined in claim 1, wherein, when a free time slot in the V5.2 interface has been allocated for the emergency call within said predetermined period of time t2, the call setup requests over the V5.2 interface are enabled.

3. The method as defined claim 2, wherein, when a free time slot has been allocated for the emergency call in the V5.2 interface within said predetermined period of time t2:

a message indicating allocation of a time slot is given by a process responsible for the emergency call to a higher-level process responsible for signalling;

timer (T2) is stopped by the higher-level process; and the call setup requests are enabled by the higher-level process.

4. The method as defined in claim 1, wherein, if the setup of the emergency call is interrupted when the subscriber hangs up before a time slot is released in the V5.2 interface, then the call setup requests over the V5.2 interface are enabled.

5. The method as defined claim 4, wherein, when the subscriber who initiated the emergency call hangs up before a time slot in the V5.2 interface is released;

a higher-level process responsible for signalling is given an on-hook message;

timer (T2) is stopped by the higher-level process; and the call setup requests are enabled by the higher-level process.

6. The method as defined claim 1, wherein:

the call setup requests are disabled by a higher-level process; and the attempts to reserve a time slot in the V5.2 interface are continued by a lower-level process responsible for the emergency call.

7. The method as defined claim 1, wherein the predetermined period of time t1 is defined using a timer (T1) controlling the time used for normal call setup, said timer being started at the beginning of call setup and/or stopped by a higher-level process responsible for signalling.

8. The method as defined claim 1, wherein the predetermined period of time t2 is defined using a timer (T2) controlling the disabled state of the call setup requests, said timer being started after time t1 if normal call setup fails.

9. The method as defined in claim 1, wherein, if the attempts to allocate a time slot in the V5.2 interface fail during said predetermined period of time t2, then the emergency call is released and the call setup requests over the V5.2 interface are enabled.

10. The method as defined claim 9, wherein, if a lower-level process responsible for the emergency call does not receive a message indicating allocation of a time slot in the V5.2 interface from the local exchange (LE) within the predetermined period of time t2, then the lower-level process is instructed by the higher-level process responsible for signalling to release the emergency call.

11. The method as defined claim 1, wherein, if the attempts to allocate a time slot in the V5.2 interface for the emergency call fail during the combined period of time t1+t2, then the emergency call is released and the call setup requests are enabled.

12. The method as defined in claim 11, wherein, if a lower-level process responsible for the emergency call does not receive a message indicating allocation of a time slot in the V5.2 interface from the local exchange (LE) within the predetermined period of time t2, then the lower-level process responsible for the emergency call is instructed by a higher-level process responsible for signalling to release the emergency call upon receipt of a next response to a failed allocation request for a time slot in the V5.2 interface if the allocation of a time slot has failed again.

13. The method as defined claim 1, wherein, after time t1;

of the ongoing calls, a call other than an emergency call is selected; the the selected call is disconnected via a forced process to release a time slot in the V5.2 interface;

the emergency call is set up using the released time slot; and the call setup requests are enabled.

14. The method as defined in claim 13, wherein:

after a lapse of the predetermined period of time t2 and setup of the emergency call is unsuccessful, forced disconnection of another ongoing call other than an emergency call or the previous call selected to release a time slot is started; and if attempts to allocate a time slot in the V5.2 interface for the emergency call fail again, the failed emergency call to the wireless network is released.

15. The method as defined in claim 14, wherein:

after the predetermined period of time t2, the forced call disconnection of another ongoing call other than an emergency call or the previous call selected to release a time slot is started by the higher-level process responsible for signalling, and the failed emergency call to the wireless network is disconnected after forced call disconnection has failed again.

16. The method as defined in claim 13, wherein:

said call other than an emergency call is selected by a higher-level process responsible for signalling;

an instruction to disconnect the selected call is given by a higher-level process responsible for signalling to the lower-level process responsible for the selected call;

forced disconnection of the selected call is effected by the lower-level process; and a timer (T2) controlling the disabled state of the call setup requests is started by the higher-level process responsible for signalling.

17. The method as defined in claim 16, wherein the higher-level process responsible for signalling is informed of the disconnection of the selected call by the lower-level process responsible for the selected disconnected call.

18. The method as defined in claim 13, wherein after a lapse of a second predetermined period of time t2, the emergency call is released and the call setup requests are enabled.

19. The method as defined claim 18, wherein, after the lapse of the second predetermined period of time t2, setup of new calls is enabled by a higher-level process responsible for signalling, and a lower-level process responsible for the emergency call is instructed by the higher-level process responsible for signalling to release the emergency call.

* * * * *